United States Patent Office 3,363,683
Patented Jan. 16, 1968

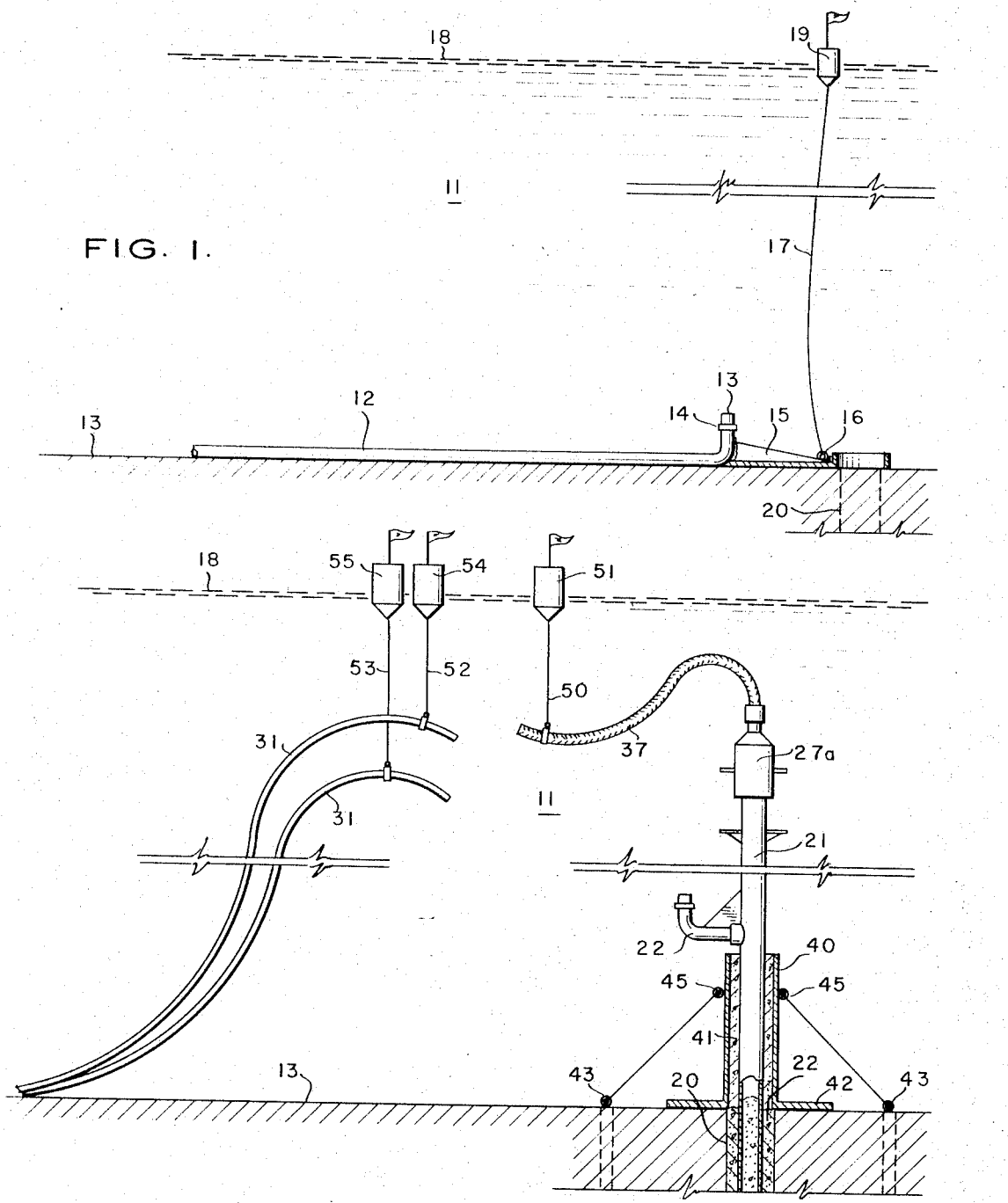

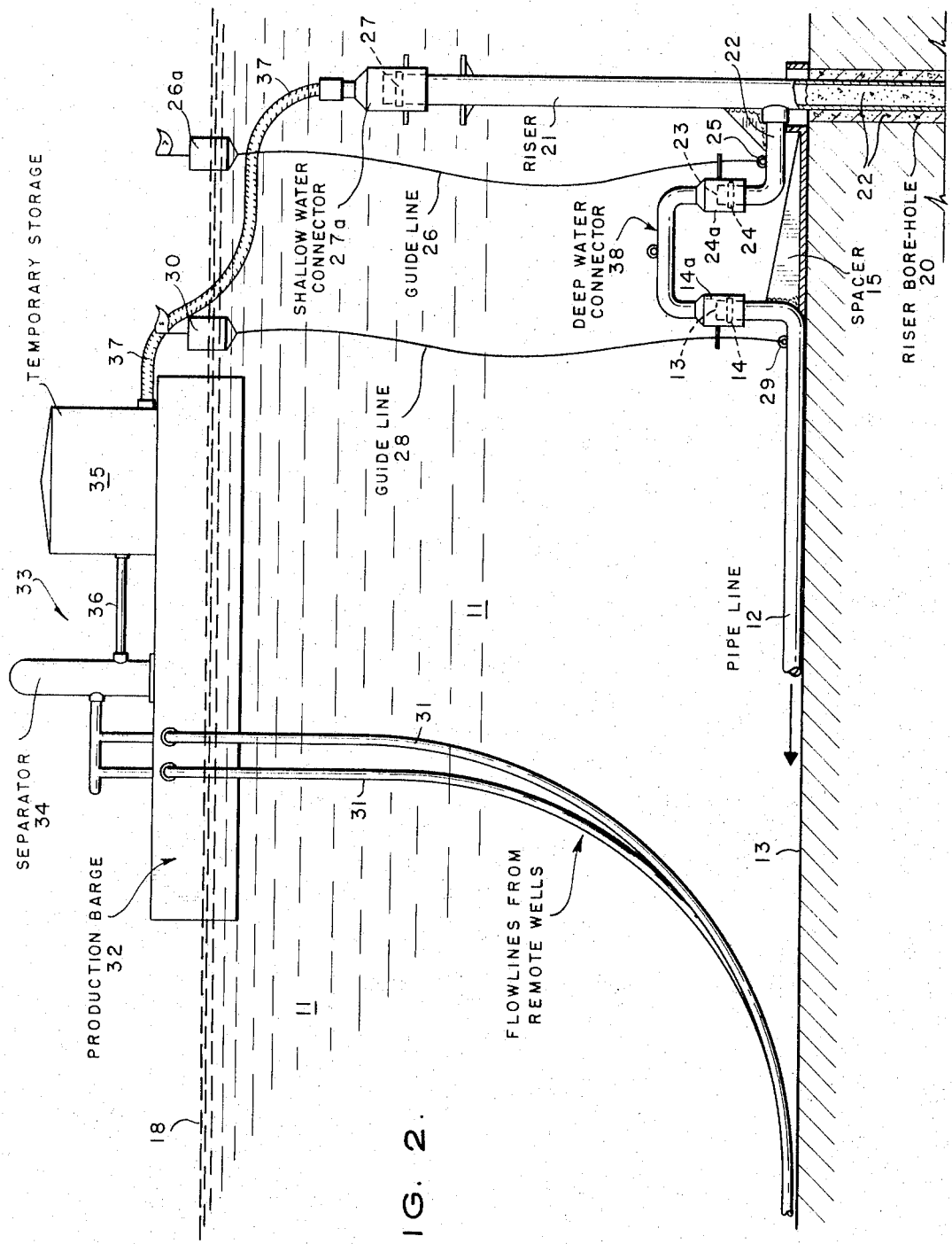

3,363,683
OFFSHORE APPARATUS AND METHOD
Charles B. Corley, Jr., and Martin O. Pattison, New Orleans, La., assignors to Esso Production Research Company
Filed Dec. 23, 1965, Ser. No. 515,978
15 Claims. (Cl. 166—.5)

ABSTRACT OF THE DISCLOSURE

A flow line extending to a floating vessel is connected to a pipeline on water bottom through a pipe riser extending from water bottom to adjacent water surface, the flow line being releasably and flexibly connected to the riser on the vessel by a flexible conduit so that the vessel may be moved away with the flexible conduit remaining attached to the riser and suspended below water level.

---

The present invention is directed to off-shore apparatus and method for connecting well flow lines and pipelines. More particularly, the invention is concerned with off-shore apparatus and method for use in deep waters. In its more specific aspects, the invention is concerned with connecting well flow lines and/or pipelines to a floating production platform and the like in deep waters without extensive use of divers.

In oil and gas field operations in deep waters which may be of depths of 400 feet or greater, it may be impractical to construct platforms which are supported on water bottom. This necessitates the use of floating structures for conducting drilling operations and for use in supporting production equipment such as but not limited to separators, meters, storage tanks and well servicing apparatus. Where floating vessels are used to support production equipment, oil and gas produced by wells to the floating structure must be loaded on barges or tankers for transport to the point of consumption, or otherwise pipelines must be used for the same purpose. In connection of the pipeline to production equipment, such as separators or storage tanks, on the floating platform, where the pipelines are on bottom at water depths of 400 feet or greater, a considerable problem exists in that divers are unable to work at such depths for any practical length of time. Accordingly, the present invention is concerned with the use of pipelines for transportation of oil and gas from submarine wells and provides apparatus and method for connecting pipelines on water bottom to a floating production platform.

The present invention may therefore be briefly described as offshore apparatus including a floating vessel adapted to be connected to one or more well flow lines extending to the vessel. A pipe riser is arranged in the body of water to extend from water bottom to a point below water surface such that flexible conduit means may be fluidly and releasably connected to production equipment on the vessel and with the pipe riser. The pipeline on water bottom is connected with its free end to the pipe riser adjacent water bottom by releasable connection means.

The present invention also contemplates a method for connecting a pipeline on water bottom to a pipeline riser which involves arranging the pipe riser in the body of water adjacent a free end of the pipeline, the pipe riser extending from water bottom to a point below water surface. The riser is arranged such that it is spaced a selected distance from the free end of the pipeline. Thereafter, the upper end of the pipe riser is flexibly and releasably connected to production equipment on the floating platform and the pipeline free end is releasably connected to the pipe riser adjacent water bottom.

The present invention is quite advantageous and useful in that it eliminates the necessity of divers working in waters of extreme depth. This is avoided since the upper end of the pipe riser extends from water bottom to a depth sufficiently below water surface where severe storm wave action does not reach. Thus, the upper end of the pipe riser may extend to within 100 to 200 feet of water surface at which depths divers may easily work without danger to life and health.

The present invention will be further illustrated by reference to the drawing in which FIGURE 1 shows a pipeline arranged on water bottom;

FIGURE 2 illustrates the present invention with the pipeline connected to the riser and with the riser flexibly connected to production equipment on the floating platform;

FIGURE 3 illustrates the assembly after removal of the floating vessel of FIGURE 2.

Figure 4:
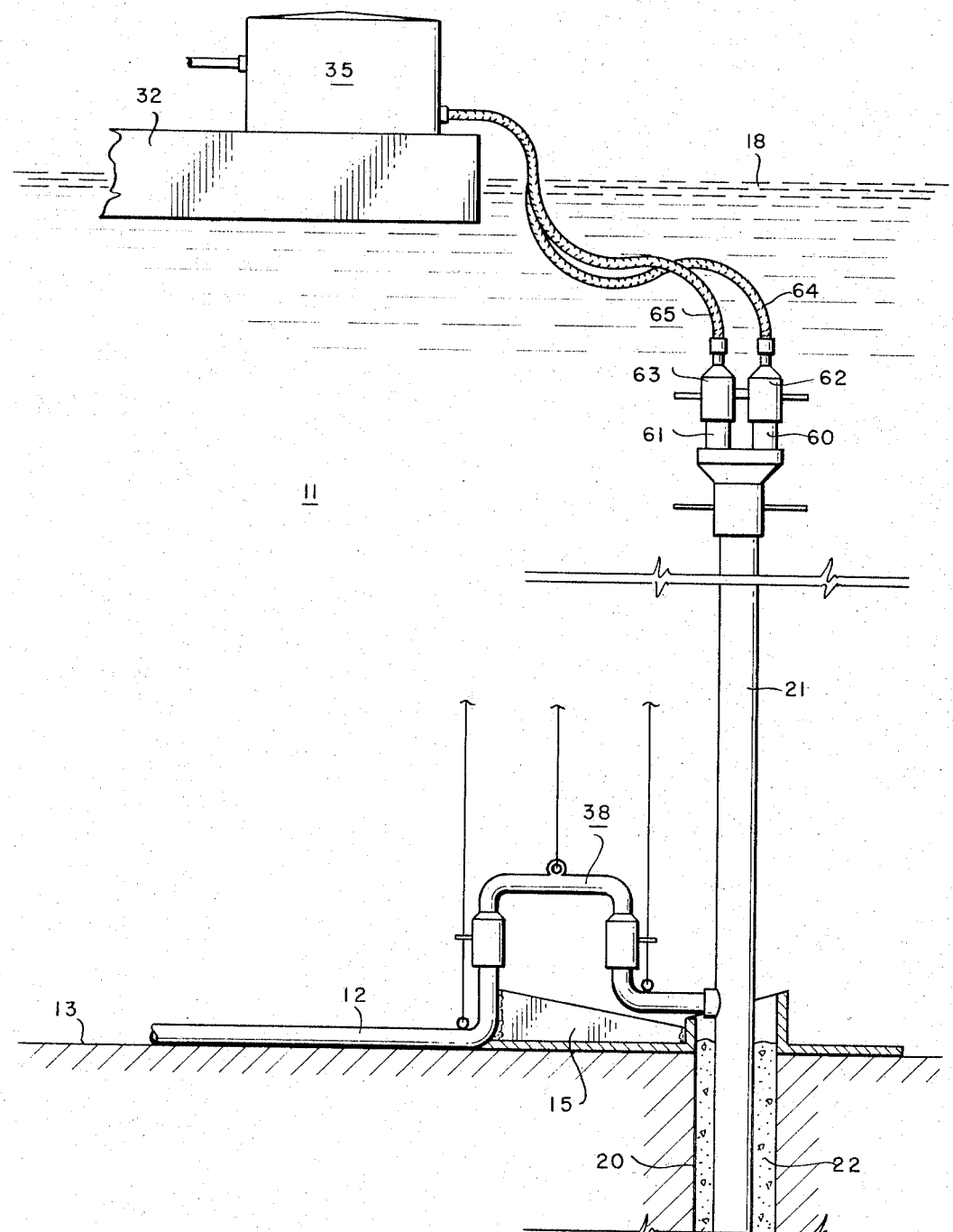
FIGURE 4 shows a modification of the embodiment and mode of FIGURE 2.

Referring now to the drawing in which identical numerals will designate identical parts, and specifically to FIGURE 1, numeral 11 designates a body of water having a pipeline 12 laid on water bottom 13. The free end of the pipeline 12 terminates in a vertical opening 13 provided with a portion 14 of a connection means. The pipeline has connected to it a horizontal extension or spacing member 15. The free end 16 of the spacing member 15 has affixed to it a guideline 17 which extends to the water surface 18 and is connected to a buoyant member such as a buoy 19. The spacing member 15 and the guideline 17 and buoy 19 allow a floating drilling rig on the water surface 18 to position and drill a hole 20 at the predetermined proper location into which the pipeline riser, which will be described hereinafter, is arranged. At this point, it is to be emphasized that the bore hole 20 serves only to locate and support the pipe riser and is not an oil or gas well and is not drilled to penetrate a hydrocarbon productive formation.

Referring now to FIGURE 2, a pipe riser 21 is arranged and cemented in bore hole 20 with cement 22 which fills the bore hole 20 and extends into the riser 21, as shown, to a level corresponding to water bottom 13. The riser 21 is provided with a lateral conduit 22, the free end 23 of which turns upwardly and is provided with the bottom portion of a connection means 24. The lateral conduit 22 has connected to it by means 25 a guideline 26 which extends to the water surface 18 and is supported there by a buoyant member such as buoy 26a.

The upper end of the pipe riser 21 is provided with the bottom portion of a connection means 27 which is similar to means 14 and 24.

The pipeline 12 is also provided with a guideline 28 which is connected to the pipeline by means 29 and extends to water surface 18 and is supported at the water surface by a buoyant member such as buoy 30.

Well flow lines, such as 31, from one or more submarine oil wells drilled in water bottom 13 and not shown here extend to the vessel 32 floating at the water surface 18. The well flow lines 31 discharge into tank means, generally indicated by numeral 33, and comprising oil-gas-water separators such as 34 and the like and storage tank 35. The discharge from the flow lines 31 is freed of gas and/or water and then flows by line 36 into storage 35.

Storage 35 connects to the pipe riser by a flexible connection means indicated by numeral 37, the lower end of which is provided with the upper end of a connection means 27a which automatically matingly engages with connection 27 on the upper end of pipe riser 21 and forms a fluid tight connection. Guideline 26 or other guide means not shown may be used to properly position connection means 27a for engagement with connection 27. Thus, in accordance with this embodiment and mode of the present invention, a connection is made with the pipeline 12 through the riser 21 by lowering on guidelines 26 and 28 a pipe connection member 38, the ends of which are provided with connection means 14a and 24a, which matingly engage respectively with connection means 14 and 24 to form a fluid-tight connection. With the connection member 38 in place, production from wells may then flow through lines 31, separator 34, conduit 36, tank 35 and connection means 37 downwardly into pipe riser 21 and thence through lateral conduit 22 and connection member 38 to pipeline 12 and thence to shore or tankers, as may be desired.

With the pipe riser 21 extending to below the water surface 18, a distance sufficient to allow divers to work safely, and with remotely connecting the pipeline 12 to the pipe riser 21 by guidingly lowering the member 38, it is now possible to produce oil and gas wells without endangering personnel.

Referring now to FIGURE 3 in which identical numerals designate identical parts, the pipe riser 21 is shown apart from the pipeline 12, but in a condition where the vessel 32 and its attendant structure are removed. The vessel 32 may be removed for repairs or for use elsewhere. Likewise, during a storm it may be desirable to remove vessel 32 to a safe berth or elsewhere. Also, in this embodiment the pipe riser 21 is shown enclosed in an outer casing 40 having cement 41 arranged between it and the outer wall of the riser 21 to provide stability to the riser 21. Likewise, the riser 21 and its outer casing 40 are shown supported with a base plate 42 to provide additional stability to the structure and with a plurality of anchor means 43 spaced peripherally around the riser 21 and anchored to the casing 40 through anchor lines 44 which connect to the casing 40 by means 45. While several means are provided and are described for imparting rigidity to the structure, one or more or all of these means may be used as required. Thus, it is contemplated that in some instances less than all of the several rigidity imparting means may be used. Also, it is to be understood that other means besides those described may be used if desired or necessary to provide stability or rigidity to the riser 21. The embodiment of FIGURE 3, as illustrated, is provided such that rigidity is imparted to the riser 21 to counteract the effect of ocean currents and the tendency for a long tubular member to buckle or bend.

It may be desirable to move the floating vessel if a severe storm is forthcoming or if major repairs or inspection are desired.

With the vessel 32 removed, the flexible connection member 37 may be supported at the water level 18 by means of a guideline 50 connected thereto and extending to the water surface 18 and supported by a buoyant member such as buoy 51.

Similarly, well flow lines 31, a portion of which may be flexible, may be supported on their upper ends by lines 52 and 53, which connect respectively to buoyant members 54 and 55 at the water surface 18. Thus, well equipment and riser components may be suspended below water level to avoid storm damage.

Referring now to FIGURE 4 wherein identical numerals designate identical parts to the other embodiments, the upper end of the pipe riser 21 is modified to provide a plurality of outlets 60 and 61 which are connected through connection members 62 and 63 to a plurality of flexible connection means 64 and 65 which in turn connect to tank 35 on floating vessel 32. The tank 35 will then connect to separators and well flow lines such as illustrated in FIGURE 2.

In the mode of FIGURE 4, the flexible connection members 64 and 65 may lead to separate vessels, as may be desired.

While the invention has been described and illustrated relative to connecting a pipeline to the riser, it is within the purview of this invention to connect one or more well flow lines to a pipe riser in accordance with this invention. Hence, the invention is not limited to any particular mode or embodiment used for illustration purposes only.

The nature and objects of the present invention having been fully described and illustrated and the best mode and embodiment contemplated set forth, what we wish to claim as new and useful and secure by Letters Patent is:

1. Offshore apparatus which comprises, a floating vessel in a body of water connected to at least one flow line extending to said vessel from at least one well, a pipe riser arranged in said body of water to extend from water bottom to a point below water surface, flexible conduit means extending between said pipe riser and said vessel and fluidly and releasably connected to said flow line on said vessel and to said pipe riser, a pipeline on water bottom extending with a free end to a point adjacent said pipe riser, and means releasably connecting said free end of said pipeline to said pipe riser adjacent water bottom.

2. Offshore apparatus in accordance with claim 1 in which the vessel is provided with tank means and in which said tank means is connected to said flow line.

3. Apparatus in accordance with claim 2 in which the tank means comprises separation and storage means.

4. Apparatus in accordance with claim 1 in which: (1) a lateral conduit having a free end extends from said riser adjacent water bottom; (2) the free end of said pipeline extends to a point adjacent the free end of said lateral conduit; and (3) said releasable connecting means connects the free end of said pipeline to the free end of said lateral conduit.

5. Apparatus in accordance with claim 4 in which guide means are provided for guidingly connecting said releasable connecting means.

6. Apparatus in accordance with claim 5 in which the guide means extend to the water surface from said pipeline and lateral conduit.

7. A method for conecting a flow line extending from at least one well to a floating vessel in a body of water to a pipeline on water bottom which comprises, arranging a pipe riser in said body of water adjacent a free end of said pipeline to extend from water bottom to a point below water surface, flexibly and releasably connecting said pipe riser to said flow line at a point on said vessel, and releasably connecting the free end of said pipeline to said pipe riser.

8. A method in accordance with claim 7 in which the pipeline is releasably connected to said pipe riser by guidingly lowering a connection member to a point adjacent the free end of said pipeline and the lower end of said pipe riser, and releasably connecting said connection member to said free end and to said pipe riser adjacent water bottom.

9. A method for connecting a flow line extending from a submarine well to a pipeline on water bottom wherein a pipe riser is arranged in said body of water adjacent a free end of said pipeline to extend from water bottom to a point below water surface, which comprises, flexibly and releasably connecting said pipe riser to said flow line at a point above water surface, and releasably connecting the free end of said pipeline to said pipe riser.

10. A method in accordance with claim 9 in which the pipe riser is anchored to water bottom.

11. A method in accordance with claim 9 in which the pipe riser is anchored to water bottom by cementing it in a bore hole.

12. A method in accordance with claim 9 in which the free end of said pipeline is remotely releasably connected to said pipeline.

13. A method for connecting a conduit on water bottom to a floating vessel in a body of water which comprises:
said vessel being connected to a flow line extending to it from a well on water bottom;
arranging a pipe riser in said body of water to extend from water bottom upwardly and fluidly connect to said vessel above water surface; and
remotely connecting said pipe riser to said conduit from water surface.

14. A method in accordance with claim 13 in which the pipe riser and conduit are connected by guidingly and horizontally lowering a connection member from water surface and remotely connecting said riser and conduit to opposite ends of said connection member from water surface.

15. Offshore apparatus which comprises:
a floating vessel in a body of water;
a flow line extending to said floating vessel from a submarine well on water bottom;
a pipe riser extending upwardly from water bottom and fluidly connected to said floating vessel above water surface and having a lateral free end adjacent water bottom;
a conduit on water bottom having a free end spaced horizontally from the free end of said riser; and
means operated from water surface for horizontally connecting the free ends of said riser and said conduit.

References Cited

UNITED STATES PATENTS

| 3,177,942 | 4/1965 | Haeber | 166—.5 |
| 3,220,477 | 11/1965 | Jones | 166—.5 |
| 3,221,816 | 12/1965 | Shatto et al. | 166—.5 |
| 3,233,666 | 2/1966 | Geer et al. | 166—.5 |
| 3,233,667 | 2/1966 | Van Winkle | 166—.6 |
| 3,292,695 | 12/1966 | Haeber | 166—.5 |
| 3,299,950 | 1/1967 | Shatto | 166—.5 |

FOREIGN PATENTS 947,979   1/1964   Great Britain.

CHARLES O'CONNELL, Primary Examiner.

ERNEST R. PURSER, Examiner.

R. E. FAVREAU, Assistant Examiner.